с008175997B2

United States Patent
Cho et al.

(10) Patent No.: US 8,175,997 B2
(45) Date of Patent: May 8, 2012

(54) METHOD OF APPLYING USER-DEFINED INFERENCE RULE USING FUNCTION OF SEARCHING KNOWLEDGE BASE AND KNOWLEDGE BASE MANAGEMENT SYSTEM THEREFOR

(75) Inventors: Joonmyun Cho, Daejeon (KR); Hyoungsun Kim, Daejeon (KR); Hyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 916 days.

(21) Appl. No.: 12/204,451

(22) Filed: Sep. 4, 2008

(65) Prior Publication Data

US 2009/0063384 A1    Mar. 5, 2009

(30) Foreign Application Priority Data

Sep. 5, 2007    (KR) ........................ 10-2007-0089784

(51) Int. Cl.
*G06N 5/02*    (2006.01)
(52) U.S. Cl. ......................................... 706/47; 707/759
(58) Field of Classification Search .................... 706/47; 707/759
See application file for complete search history.

(56) References Cited

FOREIGN PATENT DOCUMENTS

| JP | 2002-63033 | 2/2002 |
|---|---|---|
| KR | 10-2006-0061190 A | 6/2006 |
| KR | 10-2007-0061172 A | 6/2007 |

OTHER PUBLICATIONS

Kim et al ("Context-Aware Server Framework for Network-based Service Robots" Oct. 2006).*
Sirin et al ("Pellet: A practical OWL-DL reasoned" online Apr. 2007).*
Sirin et al "Planning for semantic web services" in Semantic web services workshop at 3rd international semantic web conference (iswc2004) [retrieved at http://www.mindswap.org/papers/SWS-ISWC04.pdf].*
Hong et al ("Context Modeling and Reasoning Approach in Context-Aware Middleware for URC System" Dec. 2007).*
Kang Zuling, et al., "Implementation and Application of Ontology Databases with User-Defined Rules (UDR) Supported", *Proceedings of the First International Conferences on Semantics, Knowledge, and Grid* (SKG 2005), Nov. 2005. (Whole Document).

* cited by examiner

*Primary Examiner* — Jeffrey A Gaffin
*Assistant Examiner* — Lut Wong
(74) *Attorney, Agent, or Firm* — Staas & Halsey LLP

(57) ABSTRACT

The user-defined inference rule is created using a knowledge base search language that is basically provided in a knowledge base management system. Accordingly, the user-defined inference rule is a knowledge base search statement and is processed using a function of searching a knowledge base as a base function of the knowledge base management system. The user-defined inference rule is applied by including a knowledge base search process and a search result in the knowledge base, when the knowledge base is changed. The user-defined inference rule is managed by a user-defined inference rule manager. The user-defined inference rule manager monitors a change in the knowledge base to determine when the user-defined inference rule is applied, executes the user-defined inference rule to obtain the execution result, and includes the execution result in the knowledge base.

7 Claims, 3 Drawing Sheets

FIG.2A

```
<ELEMENT>
      <User>USER_A</User>
      <userLocation>SEOUL</userLocation>
</ELEMENT>
<ELEMENT>
      <User>USER_B</User>
      <userLocation>TOKYO</userLocation>
</ELEMENT>
```

FIG.2B

```
PREFIX ckb cm: <http://etri.re.kr/sobot/URC/CAMUS/camus ckb cm#>
PREFIX rdf: <http://www.w3.org/1999/02/22-rdf-syntax-ns#>
PREFIX xsd: <http://www.w3.org/2001/XMLSchema#>
PREFIX owl: http://www.w3.org/2002/07/owl#
CONSTRUCT {
      ?user            ckb cm:userRegion        ?region .
}
WHERE {
      ?user            rdf:type                 ckb cm:User;
                       ckb cm:userLocation      :loc .
      :loc             ckb cm:parentEnv         ?region .
      ?region          rdf:type                 ckb cm:Region .
}
```

FIG.2C

```
<ELEMENT>
        <User>USER_A</User>
        <userLocation>SEOUL</userLocation>
        <userRegion>SEOUL</userRegion>
</ELEMENT>
<ELEMENT>
        <User>USER_B</User>
        <userLocation>TOKYO</userLocation>
        <userRegion>TOKYO</userRegion>
</ELEMENT>
```

METHOD OF APPLYING USER-DEFINED INFERENCE RULE USING FUNCTION OF SEARCHING KNOWLEDGE BASE AND KNOWLEDGE BASE MANAGEMENT SYSTEM THEREFOR

CROSS-REFERENCE TO RELATED APPLICATIONS

This application claims the benefit of Korean Application No. 10-2007-0089784 filed Sep. 5, 2007, in the Korean Intellectual Property Office, the disclosure of which is incorporated herein by reference.

BACKGROUND OF THE INVENTION

1. Field of the Invention

The present invention relates to a method of applying a user-defined inference rule in an ontology-based knowledge base management system. More particularly, the present invention relates to a user-defined rule inference enabling method using only a function of searching a knowledge base as a base function in a knowledge base management system that does not apply rule operations in a form of IF-THEN statements, similar to an inference engine based on a Tableaux algorithm.

This work was supported by the IT R&D program of MIC/IITA [2006-S-026-02, Development of the URC Server Framework for Proactive Robotics Services].

2. Description of the Related Art

As a next-generation version of a database technology that represents and uses data on the basis of a relational model, various researches have been actively performed on a knowledge representation technology that can naturally represent knowledge in the real world and automatically derive new knowledge using a logic inference. A representative technology that has been developed is a Semantic Web technology.

The Semantic Web is the next-generation intelligent Web through which a computer can understand the meaning of knowledge resources and perform a logic inference. The Semantic Web is a framework that represents information on resources (Web documents, various files, services, and the like) and relatedness/meaning information (Semantics) between the resources in a distribution environment, such as the Internet, in an ontology form to be processed by a machine (computer), and allows an automated machine (computer) to process the information. Research on the Semantic Web is actively performed with priority given to an RDF (Resource Description Framework)-based ontology technology.

Among the ontology-based knowledge representation technologies, knowledge representation technologies based on description logic can ensure soundness and completeness of a logic inference. As a representative knowledge representation technology based on description logic, there is a Web ontology language (OWL) that is suggested by the Semantic Web.

A system that draws an inference on knowledge represented on the basis of description logic may be implemented by various methods. Among them, a general method is a method of drawing an inference using rules in a form of IF-THEN statements. For example, a paper titled "Implementation and Application of Ontology Databases with User-Defined Rules (UDR) Supported" (Preceedings of the First International Conference on Semantics, Knowledge, and Grod (SKG 2005), p. 82, November 2005) by Zang Zuling and Wang Hongbing discloses a method of drawing an inference on rules in a form of IF-THEN statements using an existing database system.

In this paper, instead of a RDF or OWL-based knowledge base, a table structure of a database is used as knowledge, and a technology that simulates an inference engine as a function based on UDR (User Defined Rules) is described. That is, when an attribute table and a rule table are created in a general database and a search is executed, new attribute data is added from the rule table through a recursive call of the UDR-based function. In this method, an existing database and the stored UDR are used to simulate a description logic inference as well as a user-defined rule inference in a form of IF-THEN statements.

However, as described above, in simulating an inference process using rules in a form of IF-THEN statements and recursive applications thereof, the following problems occur.

In the above-described method, a description logic inference engine is not used. Accordingly, a description logic inference process also needs to be created according to a user-defined rule, and whenever a knowledge search is requested, a user-defined inference rule for simulating the description logic inference process and a user-defined inference rule created according to a request from a user need to be applied and executed.

When rule operations in a form of IF-THEN statements are performed, this is to simulate the description logic inference process by a chain application of a plurality of rules, which results in an infinite loop occurring due to a recursive call. In order to prevent this problem, the paper suggests a method in which an inference depth is set. However, if this method is applied, it is not possible to ensure completeness of the inference result. That is, there is a problem in that it is not possible to satisfy completeness and decidability of the inference result at the same time.

In order to solve these problems, in recent years, a Tableaux algorithm, which implements a description logic inference process by a software algorithm, is developed, and a general ontology-based knowledge base management system supports an inference based on a Tableaux algorithm.

The Tableaux algorithm shows being "unsatisfiable" by applying various conversion rules with respect to "not" of a content to be verified, and uses a method which verifies that the content to be verified is satisfiable. That is, the Tableaux algorithm shows that "not" of the content to be verified is unsatisfiable by searching all search spaces, and interferes being satisfiable. Examples of an inference engine that implements the Tableaux algorithm include FaCT, FaCT++, Pellet, and RacerPro. The inference engine that implements the Tableaux algorithm ensures soundness, completeness, and decidability of the inference result. The inference engine ensures excellent performance than that of an inference engine that implements the inference process by a chain application of rules in a form of IF-THEN statements.

However, the inference engine that implements the Tableaux algorithm is disadvantageous in that a logic inference and a rule inference defined by a request from a user are not used together. This is because rules in a form of IF-THEN statements cannot be completely converted by a description logic expression and cannot be processed by the Tableaux algorithm.

However, in a system that uses a knowledge base, it is necessary to use a proper user-defined rule inference according to a request from a user or a request from an application using a knowledge base, in addition to a logic inference. To do so, a research is performed to extend the Tableaux algorithm to include a rule inference, but satisfactory performance and result are not shown.

SUMMARY OF THE INVENTION

Accordingly, the invention has been made to solve the above-described problems in a knowledge base management system that adopts a description logic inference engine based on a Tableaux algorithm, and it is an object of the invention to provide a method of applying a user-defined inference rule using a search function that is a base function in a knowledge base management system.

In order to achieve the above-described objects, according to an aspect of the invention, there is provided a method of applying a user-defined inference rule in an ontology-based knowledge base management system including a description logic inference engine. The method includes storing the user-defined inference rule that is created using a knowledge base search language; determining whether or not to execute the user-defined inference rule; and executing the stored user-defined inference rule according to the result of determination on whether or not to execute the user-defined inference rule, and including the execution result in a knowledge base.

The description logic inference engine may be based on an Tableaux algorithm.

Whether or not to execute the user-defined inference rule may depend on whether the knowledge base is changed or not.

The method according to one aspect of the invention may further include, when the user-defined inference rule is executed and the execution result is not obtained, deleting the execution result obtained by the previous execution of the same user-defined inference rule from the knowledge base.

According to another aspect of the invention, a knowledge base management system includes an ontology-based knowledge base; a description logic inference unit that performs a description logic inference on the basis of the ontology-based knowledge base; and a user-defined inference rule managing unit that applies a user-defined inference rule input using a knowledge base search language to the ontology-based knowledge base. The user-defined inference rule managing unit stores the input user-defined inference rule, and executes the stored user-defined inference rule when the knowledge base is changed and includes the execution result in the ontology-based knowledge base, and the description logic inference unit performs a description logic inference on the basis of the ontology-based knowledge base that includes the execution result obtained by executing the user-defined inference rule, when a user performs a search operation.

The description logic inference unit may include a description logic inference engine based on a Tableaux algorithm.

The user-defined inference rule managing unit may delete the execution result obtained by the previous execution of the same user-defined inference rule from the ontology-based knowledge base, when the user-defined inference rule is executed but the execution result is not obtained.

According to a knowledge base management system of the invention, an inference rule representation language or a function of processing a user-defined inference rule created in the inference rule representation language does not need to be additionally provided. A user-defined inference rule is created using only a knowledge base search language provided by the knowledge base management system and is applied to a knowledge base. Finally, it is possible to search and use the result obtained by applying both the user-defined inference rule and a description logic inference rule. Accordingly, a user does not need to learn a new language rule together with a knowledge base search language.

Further, since high-performance description logic inference engine that can be used in only a description logic inference can be applied to the user-defined inference rule, the knowledge base can be efficiently searched.

BRIEF DESCRIPTION OF THE DRAWINGS

FIG. 2A is a diagram illustrating a knowledge base before applying a user-defined inference rule as a general knowledge base;

FIG. 2B is a diagram illustrating an example of a CONSTRUCT statement using a SPARQL language; and FIG. 2C is a diagram illustrating a knowledge base that is changed by executing a CONSTRUCT statement shown in FIG. 2B.

DESCRIPTION OF THE PREFERRED EMBODIMENTS

Figure 1:
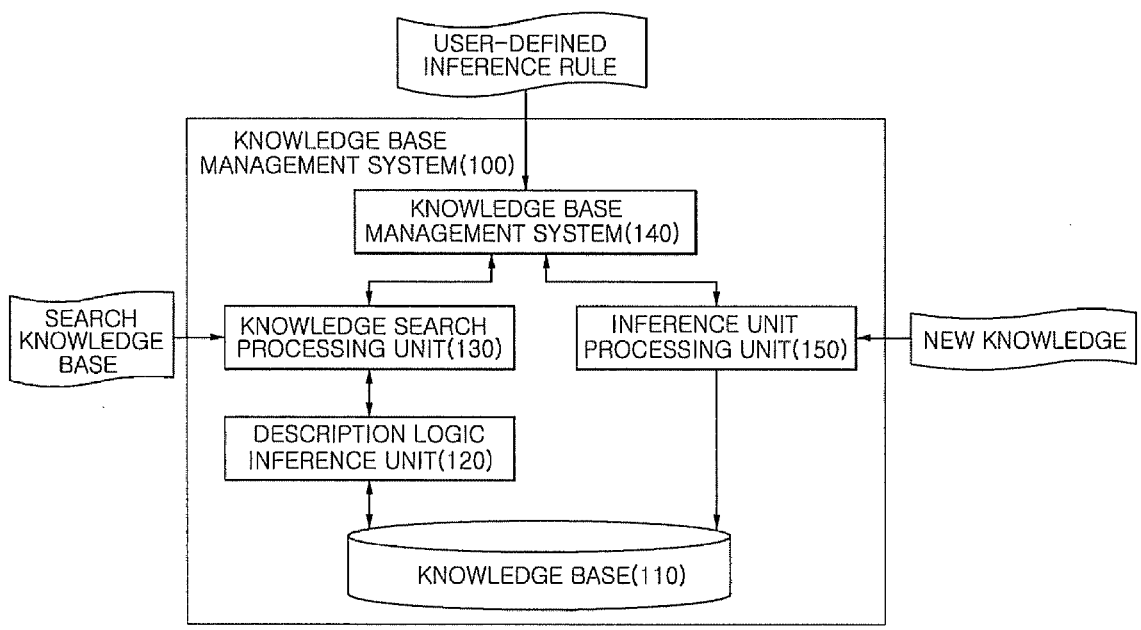
FIG. 1 is a diagram illustrating a structure of a knowledge base management system applying a user-defined inference rule according to an embodiment of the invention and interworking relations between elements.

Hereinafter, an exemplary embodiment of the invention will be described in detail with reference to the accompanying drawings.

FIG. 1 is a diagram illustrating a structure of a knowledge base management system applying a user-defined inference rule according to an embodiment of the invention and interworking relations between elements.

A knowledge base management system 100 includes a knowledge base 110, a description logic inference unit 120, a knowledge search processing unit 130, a user-defined inference rule managing unit 140, and a knowledge operation processing unit 150.

The knowledge base 110 is a place where ontology-based knowledge data is stored, and stores knowledge in a form of RDF having three elements composed of a subject, a property, and an object.

The description logic inference unit 120 returns a search result to which a logic inference is applied from the knowledge stored in the knowledge base 110, when a query for the knowledge base 110 is input. The description logic inference unit 120 includes a description logic inference engine to perform the above-described logic inference, and the description logic inference engine performs a logic inference on the basis of, for example, a Tableaux algorithm, which will be described in detail below.

At the time of a search request from a user or a search request from a user-defined inference rule manager, the knowledge search processing unit 130 queries the description logic inference unit 120 for the search request, and returns the result of the query.

The user-defined inference rule managing unit 140 stores the user-defined inference rule input by the user, determines when the stored user-defined inference rule is to be executed, and instructs the knowledge operation processing unit 150 to update the knowledge base 110.

The knowledge operation processing unit 150 updates new knowledge on the knowledge base 110 when the new knowledge is input. In the case where the user-defined inference rule managing unit 140 instructs the knowledge operation processing unit 150 to update the knowledge base 110 at a specific point of time, the knowledge operation processing unit 150 executes the user-defined inference rule and updates the knowledge base 110.

A process of searching a knowledge base in the knowledge base management system 100 according to this embodiment will now be described.

When a user desires to search the knowledge base, the user uses a knowledge base search language to query the knowledge base. The knowledge base search language is a language that is generally provided in the knowledge base management system. At the present time, in W3C, SPARQL is used as the standard of an ontology-based knowledge base search language.

For example, a user can use a SELECT statement provided by SPARQL to perform a search. In this case, it possible to query in a method similar to a SELECT statement of SQL used in a general database. The user sends a query of an item, which a user desires to search, to the knowledge search processing unit 130. Then, the knowledge search processing unit 130 queries the description logic inference unit 120 of the item to be searched.

The description logic inference unit 120 performs a description logic inference process to obtain a desired result from statements existing in the knowledge base 110, and during the description logic inference process, the description logic inference engine is used. Various types of algorithms are used by the description logic inference engine, but a Tableaux algorithm may be used as an algorithm capable of ensuring superior performance as well as soundness, completeness, and decidability. The description logic inference unit 120 uses the Tableaux algorithm to search a statement corresponding to the query from statements in the knowledge base 110, and returns the search result. Through this process, a user can perform an efficient search.

However, when the user desires to search the result on which not only the general description logic inference but also the user-defined rule inference is reflected, it is not possible to search the result using only the above-described description logic inference engine. The reason is as follows. The description logic inference engine allows an interference to be made by only a form of statements, that is, formal logic, but the user-defined inference rule is changed according to applications and requirements from the user, and thus it is required to make an inference by recognizing a substantial meaning.

The knowledge operation processing unit 150 is provided to apply the user-defined inference rule. The knowledge operation processing unit 150 updates a statement obtained by applying the user-defined inference rule input by a user on the knowledge base 110, thereby searching a statement to which the user-defined inference rule is applied using the above-described search method. The user-defined inference rule is preferably applied when the knowledge base 110 is changed. Accordingly, the user-defined inference rule does not need to be newly applied whenever the search operation is performed.

A process of applying a user-defined inference rule in the knowledge base management system 100 according to this embodiment will now be described.

When a user desires to apply the user-defined inference rule, the user inputs a necessary inference rule using the knowledge base search language, such as SPARQL, which is generally provided by the knowledge base management system.

SPARQL provides a CONSTRUCT statement that is a statement. FIG. 2B shows an example of a CONSTRUCT search statement in SPARQL. The CONSTRUCT search statement of the SPARQL is generally composed of two parts. A part (hereinafter, referred to as "WHERE clause") that is defined by "{"AND"}" in the back of a keyword "WHERE" details conditions for a statement to be searched, that is, a statement to determine whether the statement is true by comparing the statement with statements in the knowledge base. A part (hereinafter, referred to as "CONSTRUCT clause") that is defined by "{"AND"}" in the back of a keyword "CONSTRUCT" details a statement to be newly constructed when a statement of a WHERE clause is satisfied. The "CONSTRUCT" clause needs to use only variables and constants used in the "WHERE" clause. Elements to which prefixes, such as "?" or "_:", are added correspond to variables, and the other elements correspond to constants. When the knowledge base is searched and the conditions of the WHERE clause are satisfied, the CONSTRUCT statement creates a new statement of the CONSTRUCT clause. Accordingly, if the user-defined inference rule is created by using the CONSTRUCT statement, a new meaning inference that a user intends can be applied between existing knowledge bases.

The created CONSTRUCT statement is loaded by the user-defined inference rule managing unit 140 and is then stored. The user-defined inference rule managing unit 140 uses a function of searching a knowledge base of the knowledge base management system at a proper point of time to execute the CONSTRUCT statement, obtains a new statement corresponding to the inference result, and matches the new statement to the CONSTRUCT statement and stores a matching result. In this case, the proper point of time means when the knowledge base is changed. When it is determined that the user-defined inference rule managing unit 140 monitors the knowledge base and the knowledge base is changed, the user-defined inference rule managing unit 140 executes the CONSTRUCT statement.

When the knowledge base is changed, the user-defined inference rule managing unit newly executes all CONSTRUCT statements, and includes the execution result in the knowledge base. The reason is as follows. When the knowledge base is changed, the execution result of the CONSTRUCT statement executed in the previous step (knowledge determined as "true" at the previous point of time) may be changed (determined as "false" at the current point of time). When the knowledge base is not changed, the execution result of the CONSTRUCT statement is not changed, and thus it is not necessary to execute the CONSTRUCT statement. Accordingly, since the user-defined rule inference does not to be newly performed whenever a search operation is performed, search performance can be improved.

A process of applying a user-defined rule to a knowledge base by a CONSTRUCT statement will be described in detail below using an example of a knowledge base shown in FIG. 2.

When the statement stored in the existing knowledge base is as shown in FIG. 2A, it means that an attribute (current location) of "userLocation" of "USER_A" is "SEOUL" and an attribute of "userLocation" of "USER_B" is "TOKYO".

However, it is assumed that a user desires to newly define and represent an attribute (residential district) of "region" as well as an attribute of "userLocation", and desires that the result obtained by making an inference on the residential district of the corresponding user from the current location (userLocation) when querying the residential district (region) is shown. In this case, when the CONSTRUCT statement shown in FIG. 2B is created and stored in the user-defined inference rule managing unit 140, the stored user-defined rule is executed by the knowledge operation processing unit 150 at the proper point of time and is applied to the knowledge base 110. The knowledge base 110, which is changed after the CONSTRUCT statement is applied, is as shown in FIG. 2C, and a new attribute of "region" of each of "USER_A" and "USER_B" is defined, and an appropriate value is represented by the user-defined inference rule. Then, the user can query the residential district of the user and obtain a correct result.

As described above, when the knowledge base is changed and the CONSTRUCT statement is executed to apply the user-defined inference rule, there may be a case in which a search result is obtained in the past, but the search result is not obtained at the present point of time. That is, a statement of a WHERE clause may become false in the knowledge base at the present point of time and the statement of the CONSTRUCT clause may not be constructed. In this case, it is required to delete a statement that is added to the knowledge base 110 by the CONSTRUCT statement at the previous point of time. The user-defined inference rule managing unit 140 deletes the statement added by executing the previous search statement, which is matched to the user-defined rule that has became false at the present point of time, from the knowledge base 110. If necessary, the user-defined inference rule managing unit 140 can also delete the corresponding user-defined rule, that is, the corresponding CONSTRUCT statement.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer implemented method of applying a user-defined inference rule in an ontology-based knowledge base management system including a description logic inference engine, the method comprising:
   creating a search statement of a knowledge base search language from the user-defined inference rule;
   storing the created search statement of the knowledge base search language based on the user-defined inference rule;
   determining whether or not to execute the stored search statement of the knowledge base search language based on the user-defined inference rule;
   executing the stored search statement of the knowledge base search language based on the user-defined inference rule by using a function of searching a knowledge base when the result of determination is to execute the stored search statement of the knowledge base search language based on the user-defined inference rule; and
   including an execution result in a knowledge base by matching a new statement corresponding to an inference result to the search statement of the knowledge base search language and storing a matching result.

2. The method of claim 1,
   wherein the description logic inference engine is based on an Tableaux algorithm.

3. The method of claim 1,
   wherein whether or not to execute the stored search statement of the knowledge base search language based on the user-defined inference rule depends on whether the knowledge base is changed or not.

4. The method of claim 1, further comprising:
   when the stored search statement of the knowledge base search language based on the user-defined inference rule is executed and the execution result is not obtained, deleting the execution result obtained by the previous execution of the same search statement of the knowledge base search language based on the user-defined inference rule from the knowledge base.

5. A computer implemented knowledge base management system comprising:
   an ontology-based knowledge base;
   a description logic inference unit that performs a description logic inference on the basis of the ontology-based knowledge base; and
   a user-defined inference rule managing unit that applies a user-defined inference rule input to the ontology-based knowledge base by using a knowledge base search language,
   wherein the user-defined inference rule managing unit creates a search statement of a knowledge base search language from the input user-defined inference rule and stores the created search statement of the knowledge base search language based on the input user-defined inference rule, and when the knowledge base is changed, the user-defined inference rule managing unit executes the stored search statement of the knowledge base search language based on the user-defined inference rule and includes the execution result in the ontology-based knowledge base by matching a new statement corresponding to an inference result to the search statement of the knowledge base search language and storing a matching result, and
   the description logic inference unit performs a description logic inference on the basis of the ontology-based knowledge base that includes the execution result obtained by executing the stored search statement of the knowledge base search language based on the user-defined inference rule, when a user performs a search operation.

6. The computer implemented knowledge base management system of claim 5, wherein the description logic inference unit includes a description logic inference engine based on a Tableaux algorithm.

7. The computer implemented knowledge base management system of claim 5,
   wherein the user-defined inference rule managing unit deletes the execution result obtained by the previous execution of the same search statement of the knowledge base search language based on the user-defined inference rule from the ontology-based knowledge base, when the stored search statement of the knowledge base search language based on the user-defined inference rule is executed but the execution result is not obtained.

* * * * *